United States Patent
Goldberg et al.

(10) Patent No.: US 7,783,921 B2
(45) Date of Patent: Aug. 24, 2010

(54) CODE RECOVERY SYSTEM AND METHOD

(75) Inventors: Itzhack Goldberg, Hadera (IL); Yotam Medini, Binyamina (IL); Kenneth Nagin, M.P. Hamovil (IL); Shmuel Vashdi, Kfar-Saba (IL)

(73) Assignee: International Business Machines Corporation, Armonk, NY (US)

( * ) Notice: Subject to any disclaimer, the term of this patent is extended or adjusted under 35 U.S.C. 154(b) by 573 days.

(21) Appl. No.: 11/677,538

(22) Filed: Feb. 21, 2007

(65) Prior Publication Data

US 2008/0201694 A1   Aug. 21, 2008

(51) Int. Cl.
    *G06F 11/00* (2006.01)
(52) U.S. Cl. .................. 714/15; 714/4; 714/6
(58) Field of Classification Search ........... 714/4, 714/6, 15; 707/200, 202, 204
    See application file for complete search history.

(56) References Cited

U.S. PATENT DOCUMENTS

| | | | |
|---|---|---|---|
| 6,195,695 B1 * | 2/2001 | Cheston et al. | 709/221 |
| 6,324,692 B1 * | 11/2001 | Fiske | 717/171 |
| 6,986,042 B2 | 1/2006 | Griffin | |
| 7,340,638 B2 * | 3/2008 | Nicholson et al. | 714/6 |
| 7,430,686 B1 * | 9/2008 | Wang et al. | 714/6 |
| 2003/0105988 A1 | 6/2003 | Shanbhogue | |
| 2003/0149970 A1 | 8/2003 | Shanbhogue | |
| 2004/0019823 A1 * | 1/2004 | Gere | 714/13 |

OTHER PUBLICATIONS

Oracle Database 10g Release 2 High Availability.
Topspin 270 server switch.
Extreme Availability—New York Stock Exchange's new IT infrastructure puts hand-held wireless terminals in brokers' hands. (Source: http://www.comnews.com/stories/articles/0605/0605coverstory.htm).
Highly Available Databases (Source: http://www.firstql.com/highavailability.html).

* cited by examiner

*Primary Examiner*—Robert Beausoliel
*Assistant Examiner*—Charles Ehne
(74) *Attorney, Agent, or Firm*—Jeffrey P. Aiello (57) ABSTRACT

A system and method for restoring a computing system to a first operating state associated with a first system software code installed on the computing system is provided. The method comprises installing a second system software code on the computing system, while the system is operating in the first operating state. The second system software code is activated and the first system software code is deactivated to cause the computing system to operate in a second operating state. The first system software code is activated and the second system software code is deactivated to cause the system to return to the first operating state, if activation of the second system software code causes the system to operate in an undesirable manner.

20 Claims, 5 Drawing Sheets

CODE RECOVERY SYSTEM AND METHOD

BACKGROUND OF THE INVENTION

1. Field of the Invention

The present invention relates generally to recovery of code installed on a computing system and, more particularly, to a system and method for reverting to an older version of installed code, if the installation of a newer version is unsuccessful.

2. Background Information

In a computing system, there is often a need for the system software to be upgraded. The upgrade is usually performed by way of installing new software code on the system hardware. In certain systems, restore points are implemented, so that the software code can be restored to a known prior functional state, if the upgrade fails.

Unfortunately, in most instances, if the upgrade is not successful the system is, typically, shutdown and human intervention is necessary to restore the system to the old code level, so that the system can continue to operate properly.

In certain systems the system may automatically recover by restoring the system code to a prior known functional state. In this manner, the system may be able to reinstate or continue its operating status without a need for human intervention. Nevertheless, the recovery process generally either degrades system performance or interrupts the system's operation altogether.

In computing environments where the continued and uninterrupted operation of the computing system is critical, the above-noted recovery schemes are unacceptable, because any downtime or reduced performance in the operation of the system will result in significant losses to the enterprise that relies on the seamless operation of the system.

Therefore, methods and systems are needed that can avoid any system downtime or performance degradation, when system software is upgraded, or restored due to an unsuccessful upgrade procedure.

SUMMARY OF THE INVENTION

The present disclosure is directed to a system and corresponding methods that facilitate the automatic recovery of a computing system when a system upgrade is unsuccessful, without resulting in any discontinuation in the operation or degradation in performance of the computing system.

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a method for restoring a computing system to a first operating state associated with a first system software code installed on the computing system is provided. The method comprises installing a second system software code on the computing system, while the computing system continues to operate in the first operating state associated with the first system software code, wherein the first system software code is stored on a first partition of a storage medium and the second system software code is stored on a second partition of the storage medium.

In some embodiments, the method further comprises activating the second system software code and deactivating the first system software code to cause the computing system to operate in a second operating state; and activating the first system software code and deactivating the second system software code to cause the computing system to return to the first operating state, in response to determining that activation of the second system software code causes the computing system to operate in an undesirable manner.

In one embodiment, activating of the second system software code comprises changing system configuration from a first setting to a second setting to cause the computing system to switch to executing the second system software code stored on the second partition, instead of the first system software code stored on the first partition.

The computing system preferably comprises a first controller unit and a second controller unit. The first controller unit executes the second system software code instead of the first system software code to activate the second software. The second controller unit executes the first system software code and determines whether the activation of the second system software code causes the computing system to operate in an undesirable manner. The second controller unit executes the second system software code instead of the first system software code, in response to determining that the activation of the second system software code is successful.

In one embodiment, the computing system is a clustered system in which the first and second controller units are included in first and second nodes of the clustered system, respectively. In another embodiment, the computing system comprises at least a first controller unit and a second controller unit, wherein activating the second system software code and deactivating the first system software code comprises rebooting the first controller unit from the second partition, while maintaining the second controller unit operational. Preferably, activating the first system software code and deactivating the second system software code comprises rebooting the first controller unit from the first partition, while maintaining the second controller unit operational.

In certain embodiments, installing the second system software code comprises storing a second operating system code on the first partition; and storing a second system code on the first partition. In another embodiment rebooting the first controller unit from the second partition comprises loading and executing the second operating system installed on the second partition, by way of the first controller, and integrating the second system software installed on the second partition with the first system software code being executed on the system. In one embodiment, determining that activation of the second system software code causes the computing system to operate in an undesirable manner comprises determining that integrating the second system software has not been successful.

In accordance with another aspect of the invention, a system for restoring a computing system to a first operating state associated with a first system software code installed on the computing system is provided. The system comprises a logic unit for installing a second system software code on the computing system, while the computing system continues to operate in the first operating state associated with the first system software code, wherein the first system software code is stored on a first partition of a storage medium and the second system software code is stored on a second partition of a storage medium.

The system may also comprise a logic unit for activating the second system software code and deactivating the first system software code to cause the computing system to operate in a second operating state; and a logic unit for activating the first system software code and deactivating the second system software code to cause the computing system to return to the first operating state, in response to determining that activation of the second system software code causes the computing system to operate in an undesirable manner.

In accordance with another embodiment, a computer program product comprising a computer useable medium having a computer readable program is provided. The computer readable program when executed on a computer causes the computer to perform the above-disclosed actions to manage one or more nodes in a clustered environment.

One or more of the above-disclosed embodiments in addition to certain alternatives are provided in further detail below with reference to the attached figures. The invention is not, however, limited to any particular embodiment disclosed.

DESCRIPTION OF THE PREFERRED EMBODIMENTS

The present disclosure is directed to systems and corresponding methods that facilitate upgrading system software executed on a computing system. In one embodiment, the system of the invention comprises a clustered computing environment which includes a parallel or distributed network environment having a collection of interconnected computing systems.

The plurality of computing systems in the cluster can be collectively used as a single, unified computing resource such that all the computing systems in the network can share the workload of the entire system. That is, while each computing system executes its own dedicated system software, each computing system is configured to also participate in performing tasks that are assigned to other computing systems in the network.

Accordingly, if one computing system becomes unavailable, there will be no interruption in the operation of the cluster, as other participating computers will manage the workload of the unavailable computing system. The individual computing systems in the cluster may be referred to as cluster nodes or nodes.

IBM TotalStorage® Productivity Center and IBM BladeCenter® exemplary systems that provide a networked cluster environment in which the workload of the system can be shared by a plurality of nodes in the clustered environment. In is noteworthy that while one or more embodiments of the invention are described, by way of example, as applicable to a clustered computing environment, the scope of the invention should not be construed as limited to such exemplary embodiments.

In the following, numerous specific details are set forth to provide a thorough description of various embodiments of the invention. Certain embodiments may be practiced without these specific details or with some variations in detail. In some instances, certain features are described in less detail so as not to obscure other aspects of the invention. The level of detail associated with each of the elements or features should not be construed to qualify the novelty or importance of one feature over the others.

Figure 1:
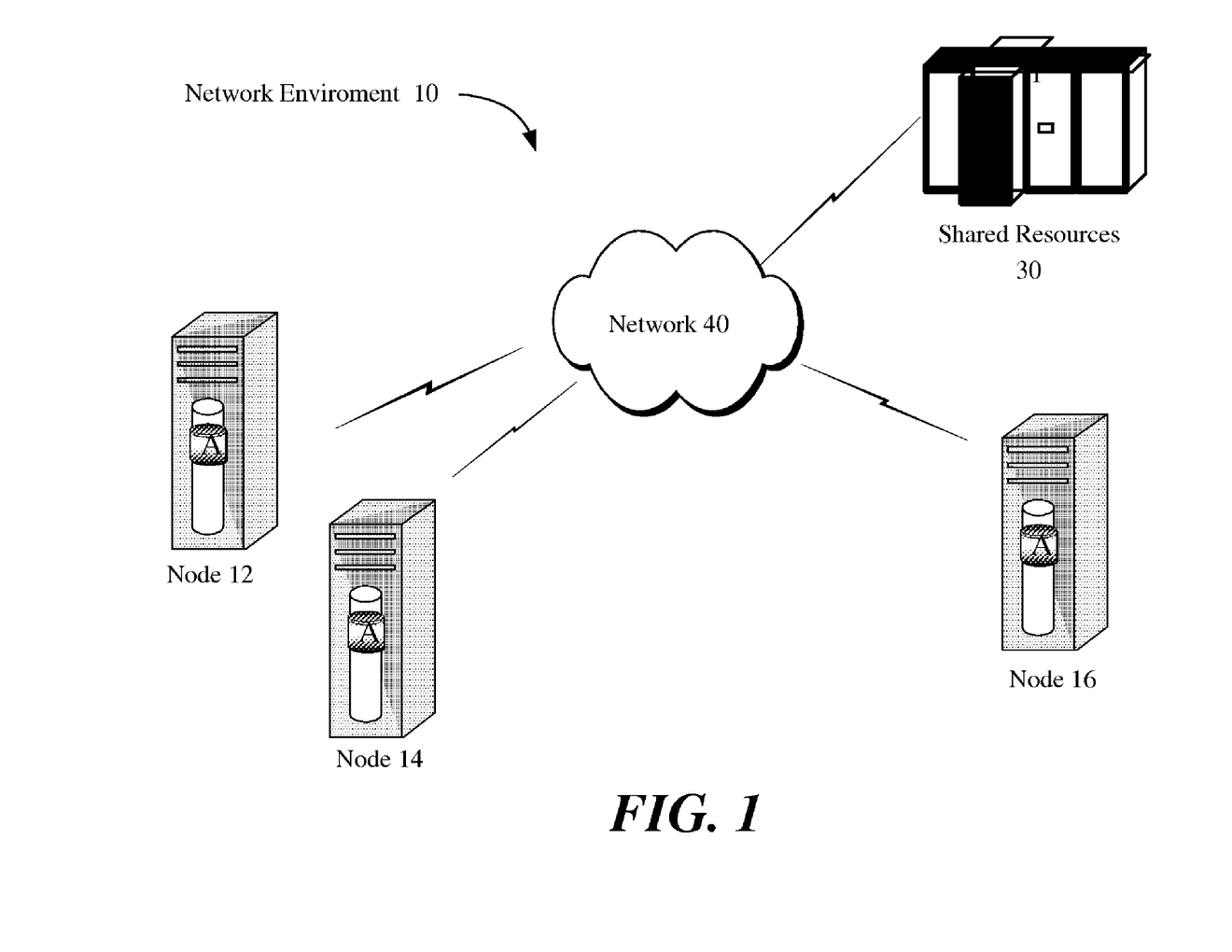
FIG. 1 illustrates a network environment wherein a plurality of computing systems are interconnected, in accordance with one embodiment of the invention.

Referring to FIG. 1, a network environment 10, in accordance with one embodiment, comprises a plurality of computing systems in a network 40. Each computing system in network 40 is logically represented as a node (e.g., nodes 12, 14 and 16). One of the nodes or an independent controller system (not shown) is configured to monitor the status of the plurality of computing systems in the network, so that if a computing system is turned off or physically removed from network 40, the change in the computing system's status can be detected, preferably in real-time.

As provided earlier, network 40 may be implemented in a clustered computing environment, in accordance with one embodiment. In some embodiments, network 40 may be implemented to connect the plurality of nodes in a parallel network, a serial network, a distributed network or a combination thereof. In a certain embodiment, a networking protocol that allows the nodes to be utilized as a single, unified cluster of computing resources is used to implement the physical and logical infrastructure of network 40.

In one embodiment, a controller system observes the status of each node connected to network 40, so that in case a node becomes unavailable, one more other nodes can take over the workload of the unavailable node. Preferably, each node can communicate with the other nodes in network 40. Status information about each node may include information about whether a computing system represented by a node has become unavailable due to, for example, being physically disconnected from network 40, turned off, or otherwise inoperable.

In certain embodiments, one or more nodes in the cluster are assigned to perform a common task or are connected to shared resources 30 by way of network 40. Shared resources 30 may comprise a plurality of devices such as shared disks that, for example, contain blocks of data for files managed by a distributed file system. In some embodiments, shared resources 30 comprise at least one of a hard disk drive, a tape drive, an optical disk drive, a floppy drive, flash memory, other types of data storage medium, or a combination thereof.

Shared resources 30 may also comprise a data storage space and a file data space, so that each node in the cluster can access data stored in the data storage space, or an object stored on file data space. In certain embodiments, the individual nodes in the cluster may not have direct access to shared resources 30 and thus may communicate with a server system (not shown) connected to network 40 to access data or services available on shared resources 30.

For example, to access a file available on shared resources 30, node 12 may contact a server system to obtain access to the content of the file. The server system may be one of a virtual server implemented as a part of the cluster or another computing system connected to network 40. In one embodiment, the server system communicates the needed lock information to node 12 in addition to the addresses of all data blocks making up the requested file. Once node 12 holds a lock on the file and knows the data block address or addresses, node 12 can access the file content.

Since the plurality of nodes in network environment 10 can be utilized as a singular and unified computing resource, in certain embodiments, when the system software on one computing system is upgraded, the system software on one or more other computing systems is upgraded as well. This upgrade process allows the entire cluster to move from an older code level to a newer code level.

To ensure the cluster's robust operation, system software for each node is preferably upgraded one at a time, so that if the upgrade to the new code level is unsuccessful, with respect to one node, one or more other nodes in network 40 can monitor the upgrade process and revert the node that has been unsuccessfully upgraded to the old code level, as provided in more detail below. It is noteworthy that the computing systems illustrated in network environment 10 of FIG. 1 are exemplary in nature. That is, network environment 10 in addition to nodes 12, 14, 16 and shared resources 30 may include additional or fewer elements, without detracting from the scope of the invention or the principals disclosed herein.

Figure 2:
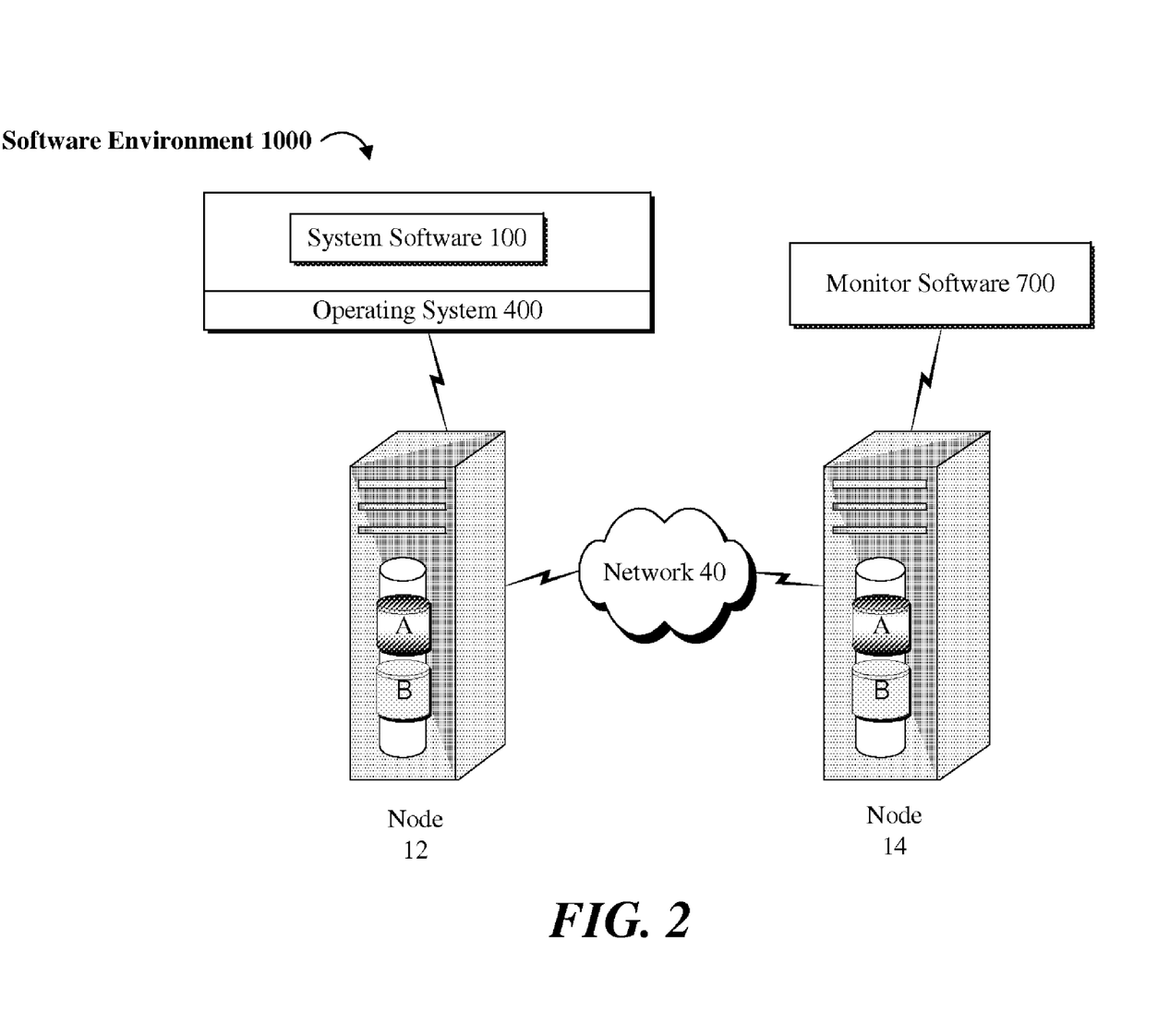
FIG. 2 illustrates a block diagram of an exemplary network environment wherein one or more computing systems in a network monitor the successful software upgrade of one or more computing systems, in accordance with one embodiment.

Referring to FIG. 2, nodes 12 and 14 are connected by way of network 40 so that a controller (e.g., processor, microprocessor, etc.) in node 12 is configured to monitor the status of node 14, and a controller in node 14 is configured to monitor the status of node 12. In one embodiment, nodes 12 and 14 each comprise a dedicated storage medium on which the executable code for their system software 100 resides. In alternative embodiments, system software 100 for nodes 12 and 14 may reside on a shared storage medium (not shown in FIG. 2).

In the following, network environment 40 is described as applicable to two nodes 12 and 14, by way of example. It should be noted, however, that this exemplary description is for the purpose of brevity and the scope of the invention should not be construed as limited to two nodes, as network 40 may comprise a plurality of interconnected nodes that may operate based on the same or similar principals disclosed in relation to nodes 12 and 14.

Figure 3:
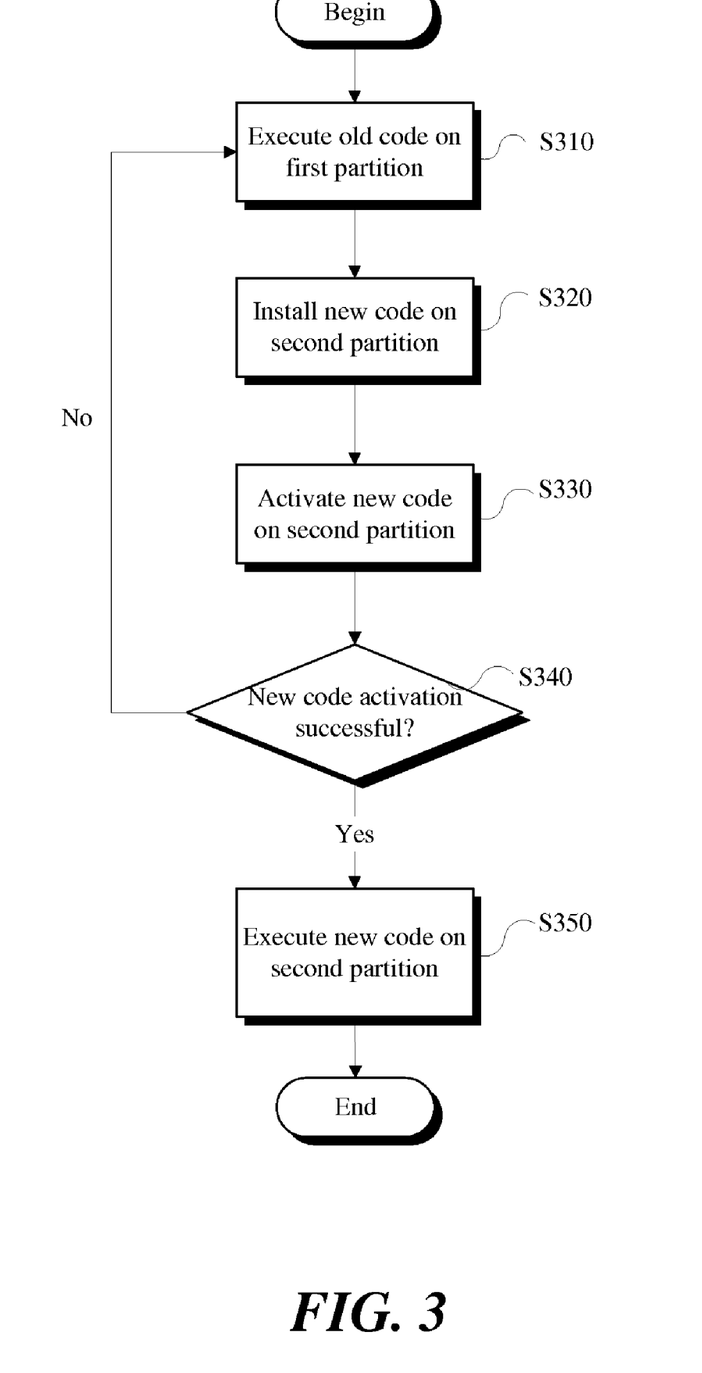
FIG. 3 illustrates a flow diagram of a method of restoring a system to a previously known operating state, in accordance with one embodiment.

In one embodiment, system software 100 is executed on top of node 12's operating system 400. The executable code associated with operating system 400 and system software 100 may be stored on partition A of node 12's storage medium, for example. As shown in FIG. 3, in one embodiment, prior to initiation of the upgrade process, controller of node 12 loads the executable code (i.e., old code) for operating system 400 and system software 100 into memory from partition A, and executes the old code to cause the computing system associated with node 12 to operate on the old code level (S310). Code level as disclosed here refers to the operating state of a computing system.

To upgrade system software 100 (and/or operating system 400) to a new code level, in one embodiment, a new executable code is installed on, preferably, partition B of node 12's storage medium (S320). Partition A and partition B preferably reside on node 12's storage medium, such that each partition can be accessed (e.g., during the boot process) with references to a distinctive partition definition. Once the new executable code is installed on partition B, the new software code is activated (S330).

Depending on implementation, the activation process for the new software code may comprise changing particular system settings, so that the operating system code stored on partition B is loaded into memory of node 12. Once the operating system 400 is running over node 12, the controller of node 12 attempts to integrate the new executable code (i.e., system code) installed on partition B into the system.

In an exemplary embodiment, a controller of node 14 (not shown) is configured to execute monitor software 700 to monitor the upgrade of system software 100 from the old code level to the new code level and to determine whether the upgrade process has been successful (S340). For the upgrade to be completed, the new system code needs to be successfully integrated into the system (e.g., be compatible with the code running on one or more of the plurality of nodes in network 40).

If the upgrade is unsuccessful (e.g., due to the new system code not fully integrating into the system), system settings for node 12 are reverted to their pre-upgrade status, so that system software 100 can regress back to the old code level (S310). That is, in the event that the upgrade procedure fails, the code level for node 12 is reinstated to a previously known operating state by way rebooting node 12 and loading and executing the old code stored on node 12's partition A.

On the other hand, if monitor software 700 running on node 14 determines that the upgrade has been successful (i.e., the new executable code on partition B is successfully integrated into the system), then controller of node 12 continues to execute the new software code stored on partition B of node 12 (S350). The execution of the new software code stored on partition B constitutes the successful upgrade of system software 100 from the old code level to the new code level.

Once node 12 has been successfully upgraded, the same or similar upgrade procedure can be employed to upgrade the other nodes in network 40. For example, the new code can be installed on partition B of node 14. After the new code is activated, a monitor software running on node 12 or another node in network 40, for example, may monitor the successful upgrade of node 14 from the old code level to the new code level such that if the upgrade fails, node 14 reverts to executing the old software code on partition A of node 14. In certain embodiments, the monitor software also tracks changes made to data and data structures after activation of the new code, in case there is a need to revert to the old code level or old data.

Advantageously, the clustered system of the present invention is configured such that during the upgrade process of a first node (e.g., node 12), one or more other nodes in network 40 (e.g., node 14) take over the workload of the first node. Accordingly, even though the performance of the clustered system may be degraded during the upgrade process, the chances that the upgraded node may become completely unavailable due to an unsuccessful upgrade are minimized. This is because in the worse case scenario the unsuccessfully upgraded node can be safely rebooted from the old code residing on partition A.

In one or more embodiments, the new executable code may be executed either before or after the old executable code has been deactivated. The deactivation of the old executable code depending on implementation may comprise discontinuing the execution of the old executable code on node 12 and or rebooting node 12 altogether to remove the old executable code from node 12's memory.

In alternative embodiments, however, at least a portion of the old executable code may remain loaded in node 12's memory in the event that the upgrade process is unsuccessful and there is a need for reverting to the old code level. In this manner, the old code level can be reinstated quickly by executing the old executable code stored in memory, or alternatively loading the old executable code from node 12's partition A.

One or more embodiments are described herein as applicable to installing or upgrading executable code for system software that, for example, controls the operation of a computing system. The executable code comprises multiple files libraries and executable directories. In a certain embodiment, the system software upgrade involves a bootstrap operation that, for example, causes the computing system to shutdown, clear its memory and restart by loading the memory with data read from a bootable section of a storage medium.

Certain embodiments of the invention are implemented in computing environments that support a concurrent code load procedure, wherein new firmware or software are installed on a storage medium of a computing system, without disrupting the operation of the computing system in its operating environment. It is noteworthy, however, that the above procedures and the respective operations can be performed in any operating environment and in any order or concurrently, regardless of numeral references associated with each state of the process.

In different embodiments, the invention can be implemented either entirely in the form of hardware or entirely in the form of software, or a combination of both hardware and software elements. For example, nodes 12, 14 and 16 may comprise a controlled computing system environment that can be presented largely in terms of hardware components and software code executed to perform processes that achieve the results contemplated by the system of the present invention.

Figure 4A:
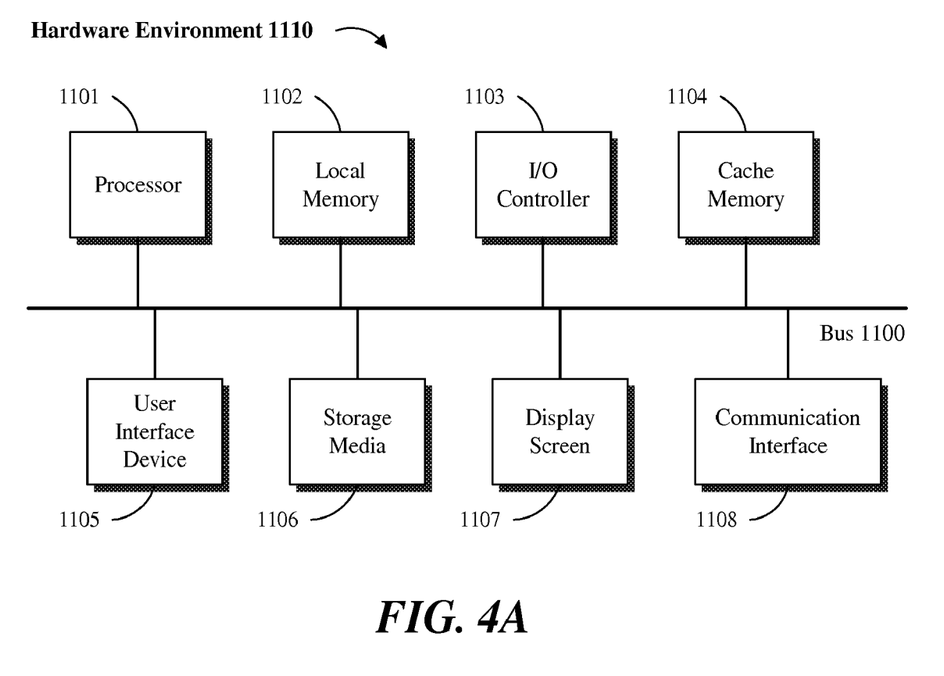
FIGS. 4A and 4B are block diagrams of hardware and software environments in which a system of the present invention may operate, in accordance with one or more embodiments.
Figure 4B:
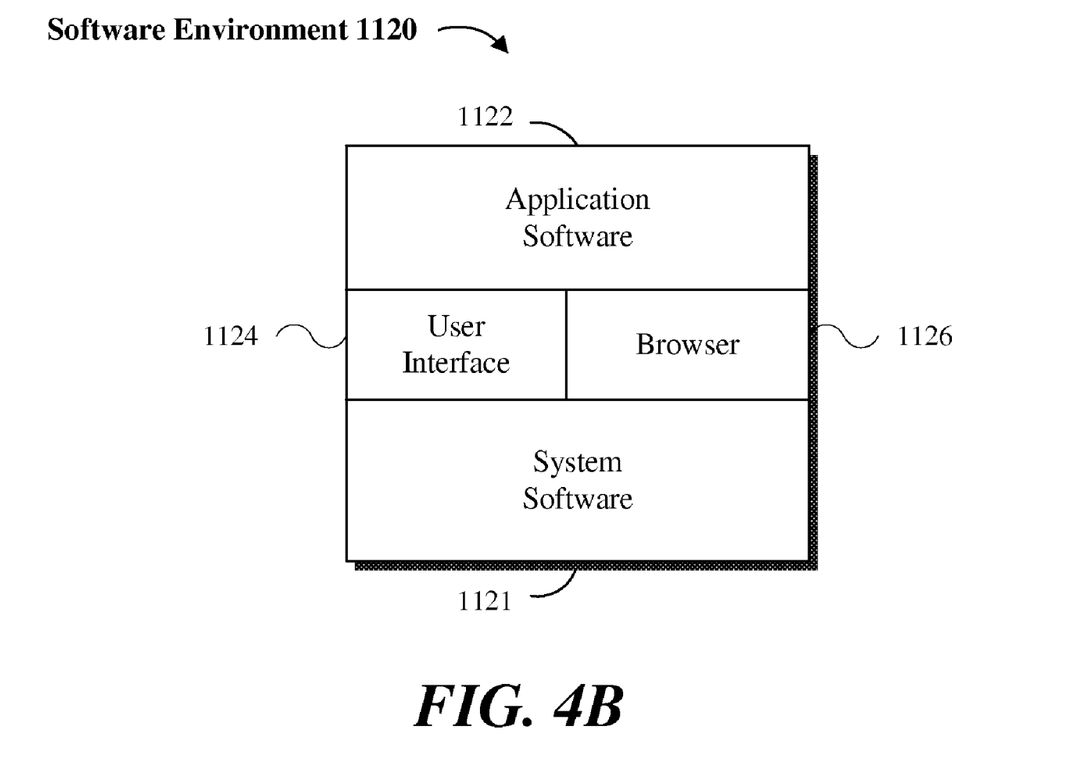

Referring to FIGS. 4A and 4B, a computing system environment in accordance with an exemplary embodiment comprises a hardware environment 1110 and a software environment 1120. The hardware environment 1110 comprises the machinery and equipment that provide an execution environment for the software; and the software provides the execution instructions for the hardware.

The software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 1120 is divided into two classes comprising system software 1121 and application software 1122. System software 1121 comprises control programs, such as the operating system (OS) and information management systems that instruct the hardware how to function and process information.

In an exemplary embodiment, monitor software 700 is implemented as application software 1122 executed on one or more hardware environments to monitor the successful upgrade of system software from an old code level to a new code level. Application software 1122 may comprise but is not limited to program code, data structures, firmware, resident software, microcode or any other form of information or routine that may be read, analyzed or executed by a controller or processor.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate or transport the program for use by or in connection with an instruction execution system, apparatus or device (e.g., computer).

The computer-readable medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital video disk (DVD).

Referring to FIG. 4A, an embodiment of application software 1122 can be implemented as computer software in the form of computer readable code executed on a data processing system such as hardware environment 1110 that comprises a processor 1101 coupled to one or more memory elements by way of a system bus 1100. The memory elements, for example, can comprise local memory 1102, storage media 1106, and cache memory 1104. Processor 1101 loads executable code from storage media 1106 to local memory 1102. Cache memory 1104 provides temporary storage to reduce the number of times code is loaded from storage media 1106 for execution.

A user interface device 1105 (e.g., keyboard, pointing device, etc.) and a display screen 1107 can be coupled to the computing system either directly or through an intervening I/O controller 1103, for example. A communication interface unit 1108, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 1110 may not include all the above components, or may comprise other components for additional functionality or utility. For example, hardware environment 1110 can be a laptop computer or other portable computing device embodied in an embedded system such as a set-top box, a personal data assistant (PDA), a mobile communication unit (e.g., a wireless phone), or other similar hardware platforms that have information processing, data storage or communication capabilities.

In some embodiments, communication interface 1108 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 4B, system software 1121 can comprise one or more computer programs that are executed after being loaded from storage media 1106 into local memory 1102. In a client-server architecture, system software 1121 may comprise client software and server software. For example, in one embodiment of the invention, client software is executed on client system 12 and server software is executed on server system 20.

Software environment 1120 may also comprise browser software 1126 for accessing data available over local or remote computing networks. Further, software environment 1120 may comprise a user interface 1124 (e.g., a graphical user interface (GUI)) for receiving user commands and data. Please note that the hardware and software architectures and environments described above are for purpose of example, and one or more embodiments of the invention may be implemented over any type of system architecture or processing environment.

It should also be understood that the logic code, programs, modules, processes, methods and the order in which the respective steps of each method are performed are purely exemplary. As noted earlier, depending on implementation, the steps can be performed in any order or in parallel, unless indicated otherwise in the present disclosure. Further, the logic code is not related, or limited to any particular programming language, and may comprise of one or more modules that execute on one or more processors in a distributed, non-distributed or multiprocessing environment.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method for restoring an operating computing system to a first operating state associated with a first system software code installed on the operating computing system, the method comprising:
   installing a second system software code on the computing system while the computing system continues to operate in the first operating state;
   activating the second system software code and deactivating the first system software code to cause the computing system to operate in a second operating state; and
   if activation of the second system software code causes the computing system to operate in an undesirable manner, then activating the first system software code to cause the computing system to return to the first operating state while the computing system continuously operates.

2. The method of claim 1, wherein activating of the second system software code comprises changing system configuration from a first setting to a second setting for causing the computing system to switch to executing the second system software code.

3. The method of claim 1, wherein the computing system further comprises:
   a first controller unit that executes the second system software code to activate the second software code; and
   a second controller unit that executes the first system software code and determines if the activation of the second system software code causes the computing system to operate in an undesirable manner.

4. The method of claim 3, wherein the second controller unit executes the second system software code in response to determining that the activation of the second system software code is successful.

5. The method of claim 3, wherein the computing system is a clustered system in which the first and second controller units are included in first and second nodes of the clustered system.

6. The method of claim 1, wherein the computing system further comprises:
   the first system software code stored on a first partition of a storage medium and the second system software code stored on a second partition of a storage medium;
   a first controller unit and a second controller unit; and
   activating the second system software code and deactivating the first system software code comprises rebooting the first controller unit from the second partition, while maintaining the second controller unit operational.

7. The method of claim 6, wherein activating the first system software code and deactivating the second system software code comprises rebooting the first controller unit from the first partition, while maintaining the second controller unit operational.

8. The method of claim 6, wherein installing the second system software code comprises:
   storing a second operating system code on the second partition; and
   storing a second system code on the second partition.

9. The method of claim 8, wherein rebooting the first controller unit from the second partition comprises:
   loading and executing the second operating system installed on the second partition, by way of the first controller; and
   integrating the second system software installed on the second partition with the first system software code being executed on the system.

10. The method of claim 9, wherein determining that activation of the second system software code causes the computing system to operate in an undesirable manner comprises:
    determining that integrating the second system software has not been successful.

11. A system for restoring an operating computing system to a first operating state associated with a first system software code installed on the operating computing system, the system comprising:
    a logic unit for installing a second system software code on the computing system while the computing system continues to operate in the first operating state;
    a first controller for activating the second system software code and deactivating the first system software code to cause the computing system to operate in a second operating state; and
    a second controller for determining that activation of the second system software code causes the computing system to operate in an undesirable manner, the second controller activating the first system software code and deactivating the second system software code upon determining that activation of the second system software code caused the system to operate in an undesirable manner while the computing system continuously operates.

12. The system of claim 11, wherein activating the second system software code comprises changing system configuration from a first setting to a second setting to cause the computing system to switch to executing the second system software code.

13. The system of claim 11, wherein the second controller executes the second system software code in response to determining that the activation of the second system software code is successful.

14. The system of claim 11, wherein the computing system is a clustered system and the first and second controller units are included in a first node and a second node of the clustered system, respectively.

15. A computer program product for managing nodes in a cluster, the product comprising a computer useable storage medium storing a computer readable program that when executed on an operating computer causes the computer to:
    install a second system software code on the operating computing system, while the computing system continues to operate in the first operating state;
    activate the second system software code and deactivate the first system software code to cause the computing system to operate in a second operating state; and
    determine if activation of the second system software code causes the computing system to operate in an undesirable manner, then activate the first system software code and deactivate the second system software code to cause the computing system to return to the first operating state while the computing system continuously operates.

16. The computer program product of claim 15, wherein activating of the second system software code comprises changing system configuration from a first setting to a second setting to cause the computing system to switch to executing the second system software code.

17. The computer program product of claim 15, wherein the computing system further comprises:

a first controller unit that executes the second system software code to activate the second software; and a second controller unit that executes the first system software code and determines if the activation of the second system software code causes the computing system to operate in an undesirable manner.

18. The computer program product of claim 17, wherein the second controller unit executes the second system software code in response to determining that the activation of the second system software code is successful.

19. The computer program product of claim 17, wherein the computing system is a clustered system in which the first and second controller units are included in first and second nodes of the clustered system.

20. The computer program product of claim 15, wherein the first system software code is stored on a first partition of a storage medium and the second system software code is stored on a second partition of a storage medium.

* * * * *